(12) United States Patent
Qian et al.

(10) Patent No.: US 7,843,121 B2
(45) Date of Patent: Nov. 30, 2010

(54) FIELD EMISSION DOUBLE-PLANE LIGHT SOURCE AND METHOD FOR MAKING THE SAME

(75) Inventors: Li Qian, Beijing (CN); Liang Liu, Beijing (CN); Peng Liu, Beijing (CN); Jie Tang, Beijing (CN); Yang Wei, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 993 days.

(21) Appl. No.: 11/603,627

(22) Filed: Nov. 21, 2006

(65) Prior Publication Data
US 2007/0222363 A1 Sep. 27, 2007

(30) Foreign Application Priority Data
Mar. 24, 2006 (CN) .................. 2006 1 0060071

(51) Int. Cl.
*H01J 1/62* (2006.01)
*H01J 1/63* (2006.01)
*H01J 1/64* (2006.01)

(52) U.S. Cl. .................... 313/497; 313/495; 313/496
(58) Field of Classification Search .......... 313/495–497
See application file for complete search history.

(56) References Cited

U.S. PATENT DOCUMENTS

| 5,686,790 | A | * | 11/1997 | Curtin et al. | ................. 313/493 |
| 2001/0015604 | A1 | * | 8/2001 | Kerslick et al. | ............. 313/310 |
| 2004/0169469 | A1 | * | 9/2004 | Hasegawa | ................... 313/553 |
| 2004/0195950 | A1 | * | 10/2004 | Ryu et al. | ................... 313/311 |
| 2005/0194889 | A1 | * | 9/2005 | Chen et al. | ................. 313/495 |

* cited by examiner

*Primary Examiner*—Nimeshkumar D Patel
*Assistant Examiner*—Christopher M Raabe
(74) *Attorney, Agent, or Firm*—Jeffrey T. Knapp

(57) ABSTRACT

A field emission double-plane light source includes a first anode, a second anode, and a cathode separately arranged between the first and second anodes. Each of the first and second anodes includes an anode substrate, an anode conductive layer formed on a surface of the anode substrate, and a fluorescent layer formed on the anode conductive layer. The cathode has a metallic based network with two opposite surfaces, each facing a respective one of the first and second anodes. Each of the surfaces of the network has a respective electron emission layer thereon facing a corresponding fluorescent layer of one of the first and second anodes. Each of the electron emission layers includes a glass matrix, and a plurality of carbon nanotubes, metallic conductive particles, and getter powders dispersed in the glass matrix. A method for making such field emission double-plane light source is also provided.

15 Claims, 5 Drawing Sheets

FIELD EMISSION DOUBLE-PLANE LIGHT SOURCE AND METHOD FOR MAKING THE SAME

RELATED APPLICATIONS

This application is related to commonly-assigned applications entitled, "FIELD EMISSION PLANE LIGHT SOURCE AND METHOD FOR MAKING THE SAME", 11/603,639, filed Nov. 21, 2006, "FIELD EMISSION LAMP AND METHOD FOR MAKING THE SAME", 11/603,628, filed Nov. 21, 2006, "FIELD EMISSION LAMP AND METHOD FOR MAKING THE SAME", 11/603,640, filed Nov. 21, 2006, and "FIELD EMISSION ELECTRON SOURCE AND METHOD FOR MAKING THE SAME", 11/603,672, filed Nov. 21, 2006, the contents of each of which are hereby incorporated by reference thereto.

BACKGROUND

1. Technical Field

The invention relates generally to cold cathode luminescent field emission devices and, particularly, to a field emission double-plane light source employing a getter to exhaust unwanted gas from therein, thereby ensuring a high degree of vacuum. The invention also relates to a method for making a field emission double-plane light source.

2. Discussion of Related Art

Recently, with the development of various plane display technologies, field emission display (FED) technology has been paid more attention, as well. FED technology potentially offers, e.g., higher brightness, lower energy consumption, broader visual angle, and higher contrast than possible with liquid crystal or plasma displays. FED technology could be utilized in many fields including, e.g., personal computers, mobile communications, flat screen display/televisions, etc. In the plane display technology, a single plane display is typically used to display in a determined direction. However, for, e.g., traffic lights, information displays used in public, a display operating in two opposite directions is required. For solving this problem, two single plane displays are arranged in two opposite directions to display in the two directions. However, this arrangement typically increases the cost and decreases the reliability of the plane display.

In order to decrease the cost of the plane display displaying in two opposite directions and improving the performance of the plane display, a field emission double-plane light source can be employed in a field emission display as a light source. A nanotube-based field emission double-plane light source usually includes a pair of anodes and a cathode arranged between the anodes. The cathode has a pair of electron emission layers on two opposite surfaces thereof, and each of the electron emission layers has a plurality of the carbon nanotubes associated therewith. The anodes each have a respective fluorescent layer facing the corresponding electron emission layers of the cathode. In use, a strong electrical field is provided between the cathode and the anodes, the field excites the carbon nanotubes of the cathode to emit electrons, and the electrons bombard the fluorescent layers of the anodes to thereby produce visible light in two opposite directions.

For a field emission double-plane light source, a high degree of vacuum within an inner portion (i.e., interior) thereof is a virtual necessity. In general, the better of the degree of vacuum of the field emission double-plane light source that is able to be generated and maintained within the field emission double-plane light source during the sealing process and/or thereafter during use, the better the field emission performance thereof is. To maintain the degree of vacuum of the field emission double-plane light source within a desired range, a conventional way is to provide a getter in the inner portion thereof. Such a getter is able to exhaust a gas produced by the fluorescent layer and/or any residual gas remaining within the field emission double-plane light source upon sealing and evacuation thereof. The getter is generally selected from a group consisting of non-evaporable getters and evaporable getters.

For the evaporable getter, a high temperature evaporating process has to be provided during the fabrication of the field emission double-plane light source, and a plane arranged in the inner portion of the field emission plane source has to be provided to receive the evaporated getter. Thus, the cost of the fabrication of the field emission double-plane light source increases, and the cathode and the anodes are prone to shorting during the high temperature evaporating process, thereby causing the failure of the field emission double-plane light source. For the non-evaporable getter, it is typically focused/provided on sidewalls of the field emission double-plane light source, and, thus, the degree of vacuum of portions away from the getter tends to be poorer, in the short-term, than that of portions near to the getter, at least until internal equilibrium can reached, thereby decreasing the field emission performance of the field emission double-plane light source or at least potentially resulting in a fluctuating performance thereof.

What is needed, therefore, is a field emission double-plane light source that overcomes the above-mentioned shortcomings to ensure a high degree of vacuum thereof, thus providing a better and more steady field emission performance during the use thereof.

What is also needed is a method for making such a field emission double-plane light source.

SUMMARY

A field emission double-plane light source generally includes a first anode, a second anode, and a cathode. Each of the first and second anodes includes an anode substrate, an anode conductive layer formed on a surface of the anode substrate, and a fluorescent layer formed on the anode conductive layer. The cathode is arranged between the first and second anodes and effectively separates the anodes from one another. The cathode includes a conductive network with two opposite surfaces, each facing a respective one of the first and second anodes. Each of the surfaces of the network has an electron emission layer facing a corresponding fluorescent layer of the first and second anodes. Each of the electron emission layers includes a glass matrix, and a certain number of carbon nanotubes, metallic conductive particles, and getter powders dispersed in the glass matrix.

A method for making a field emission double-plane light source generally includes the steps of:
(a) providing a certain number of carbon nanotubes, metallic conductive particles, glass particles (later melted to form glass matrixes), and getter powders; a conductive network; a pair of anodes (i.e., a first anode and a second anode); and a number of supporting members, each of the anodes having an anode substrate, an anode conductive layer formed on the anode substrate, and a fluorescent layer formed on the anode conductive layer;
(b) mixing the nanotubes, the metallic conductive particles, the glass particles, and the getter powders in an organic medium to form an admixture;
(c) forming layers of the admixture on an upper surface and a bottom surface of the network;

(d) drying and then baking the admixture at a temperature of about 300° C. to about 600° C. to soften and/or melt the glass particles to result in the glass matrix with the nanotubes, the metallic conductive particles, and the getter powders dispersed therein, in order to create electron emission layers on the network and thus produce a cathode; and (e) thereafter, assembling the anodes, the cathode and the supporting members, and sealing them and evacuating an interior defined by the anodes and the supporting members and thereby yielding the field emission double-plane light source.

Other advantages and novel features of the present field emission double-plane light source and the related method of making such a light source will become more apparent from the following detailed description of preferred embodiments, when taken in conjunction with the accompanying drawings.

BRIEF DESCRIPTION OF THE DRAWINGS

Many aspects of the present field emission double-plane light source and the related method of producing such can be better understood with reference to the following drawings. The components in the drawings are not necessarily to scale, the emphasis instead being placed upon clearly illustrating the principles of the present field emission double-plane light source and the related method of producing such. Moreover, in the drawings, like reference numerals designate corresponding parts throughout the several views.

The exemplifications set out herein illustrate at least one preferred embodiment of the present field emission double-plane light source and the related method of making such a light source, in one form, and such exemplifications are not to be construed as limiting the scope of such a field emission double-plane light source and a method for making such in any manner.

DETAILED DESCRIPTION

Reference will now be made to the drawings to describe, in detail, the field emission double-plane light source 10 and the method for making the same, according to the present embodiment.

Figure 1:
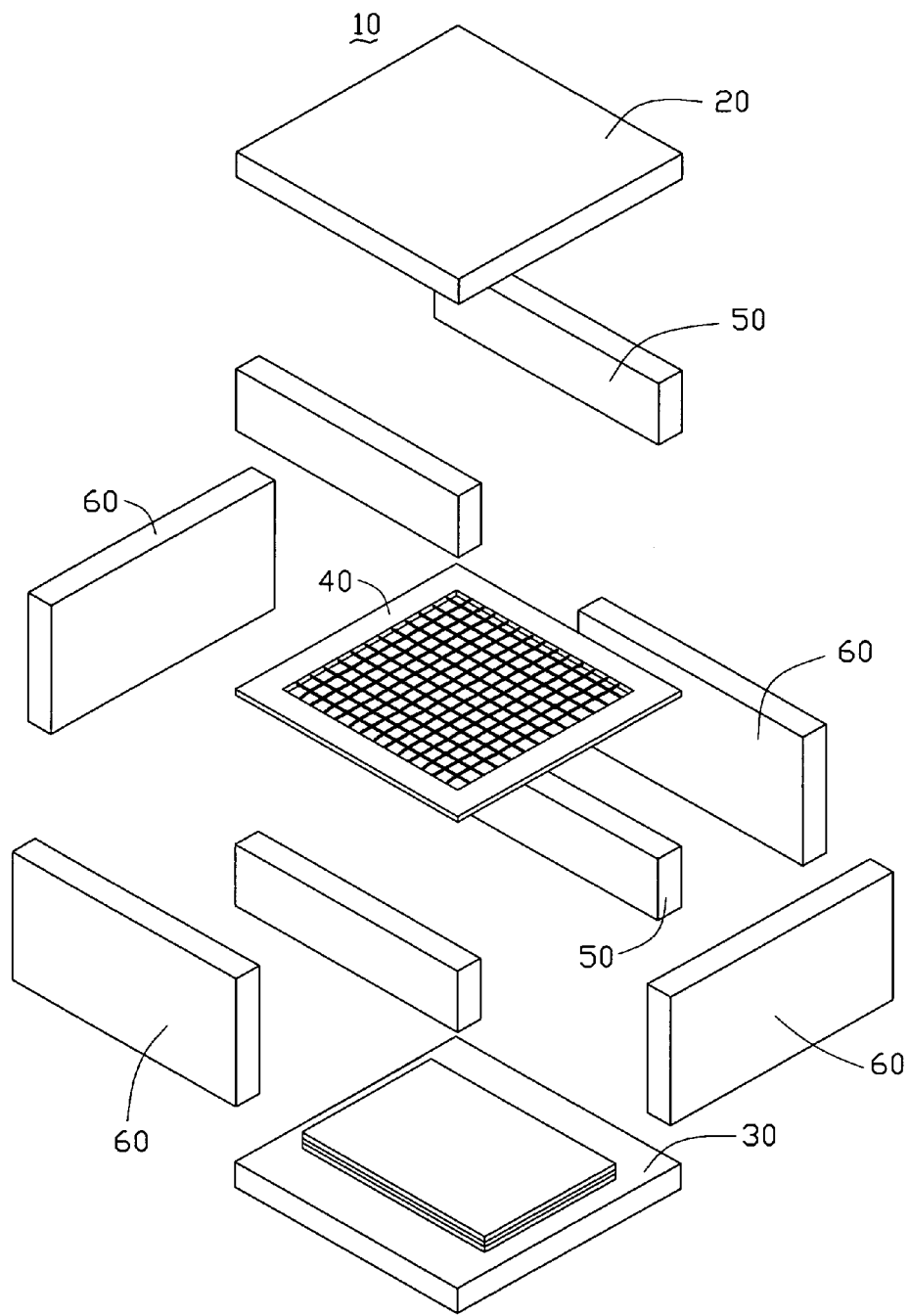
FIG. 1 is an isometric, disassembled view of a field emission double-plane light source, in accordance with an exemplary embodiment of the present device.

Referring to FIG. 1, a field emission double-plane light source 10, in accordance with an exemplary embodiment of the present device, is provided. The field emission double-plane light source 10 includes a first anode 20, a second anode 30, a cathode 40, a plurality of supporting members 50, and a sealing body 60. The cathode 40 is disposed between the first and second anodes 20, 30. The supporting members 50 are disposed between the first anode 20, the cathode 40 and the second anode 30 to separate/space the electrodes 20, 30, and 40 from one another. The sealing body 60 is formed around edges of the field emission double-plane light source 10.

The first and second anodes 20, 30 are arranged facing each other. Each of the fist and second anodes 20, 30 includes an anode substrate 22, 32, an anode conductive layer 24, 34 directly formed, respectively, on a corresponding one of a bottom surface and an upper surface of the anode substrate 22, 32, and a fluorescent layer 26, 36 formed on the anode conductive layer 24, 34, in contact therewith. The anode substrate 22, 32 is beneficially a transparent glass or optical plastic plate. The anode conductive layer 24, 34 is advantageously a transparent conductive film, such as an indium tin oxide (ITO) film. The fluorescent layer 26, 36 is usefully made of at least one of white and color fluorescent materials. Such materials are opportunely chosen so as to have many satisfactory characteristics (e.g., a high optical-electrical transferring efficiency, a low voltage, a long afterglow luminescence, etc.). In an alternative mode, an aluminum film 28, 38 can be formed directly on a surface of the fluorescent layer 26, 36 in order to improve the brightness of the field emission double-plane light source (due to both its electrical conductivity and reflectivity) and to help reduce the opportunity of the fluorescent layer 26, 36 failing prematurely (e.g., from spalling).

Figure 2:
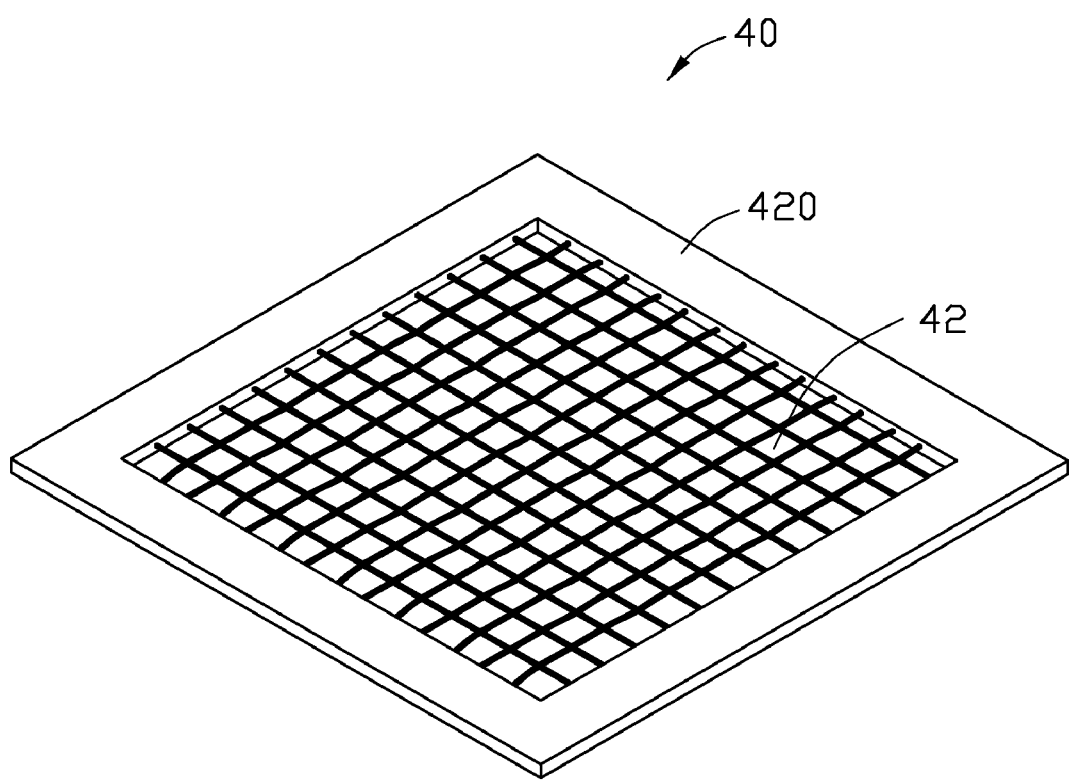
FIG. 2 is an isometric view of the cathode shown in FIG. 1.
Figure 3:
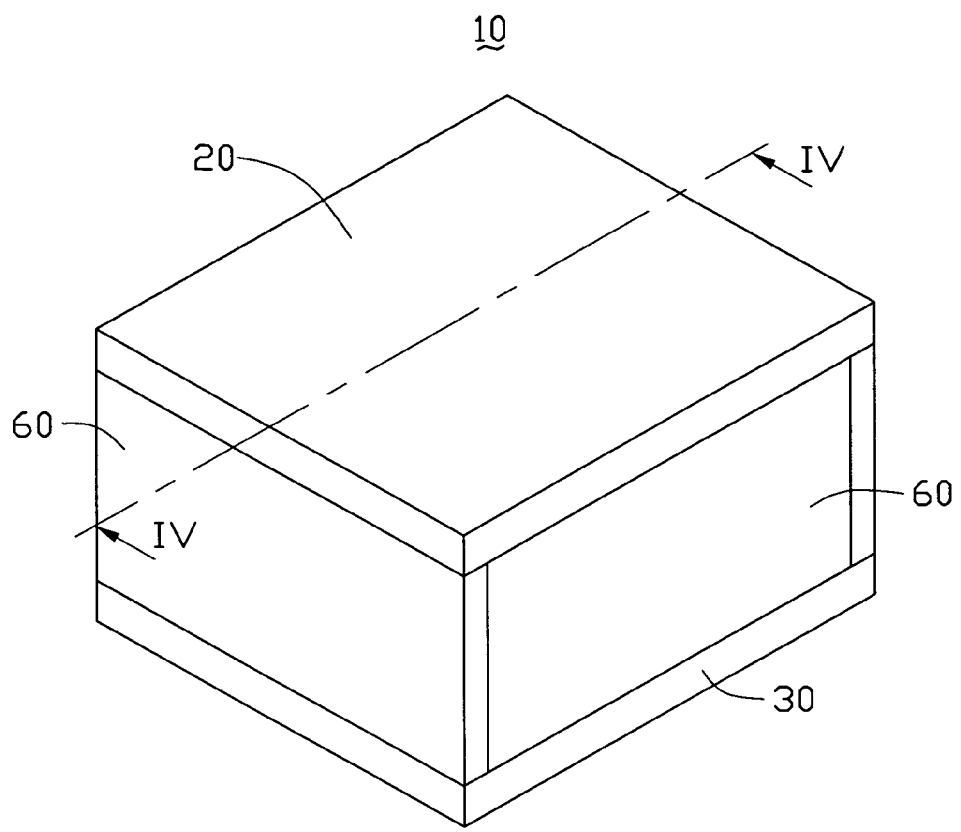
FIG. 3 is an isometric, assembled view of the field emission double-plane light source of FIG. 1.
Figure 4:
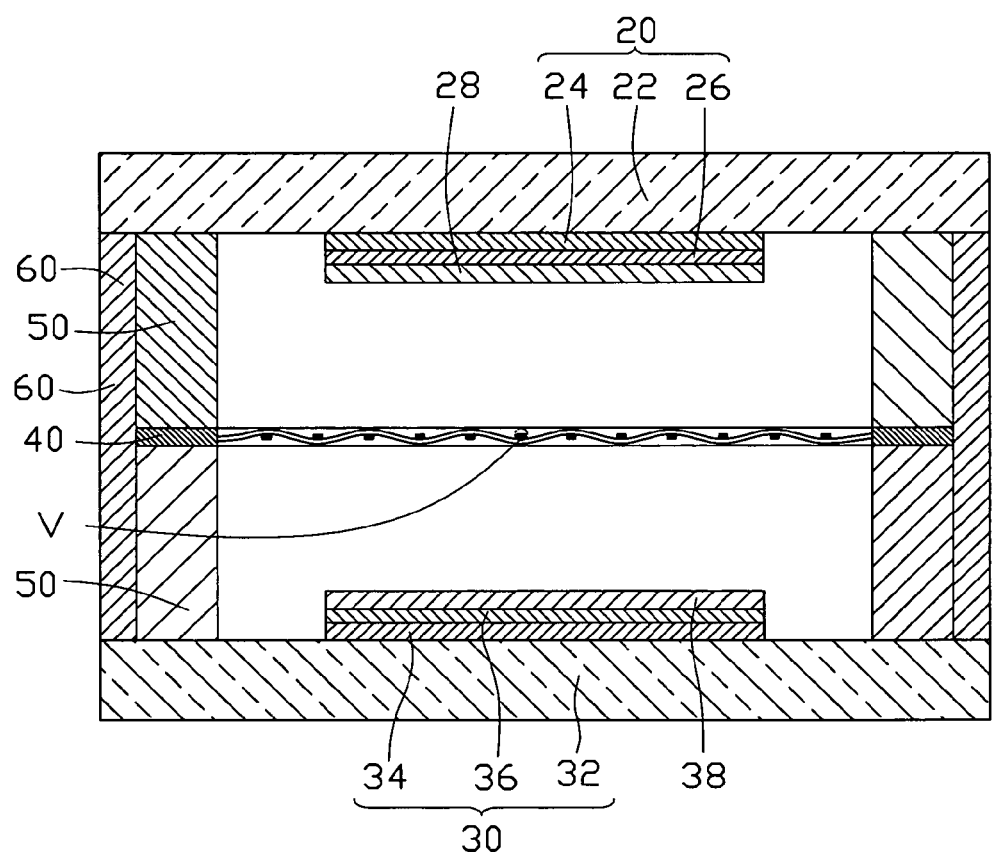
FIG. 4 is a cross-sectional view along a line IV-IV of FIG. 3.

Referring to FIGS. 2 to 4, the cathode 40 includes a conductive network 42 (e.g., a metallic based network ) having securing edges 420. The network 42 has an upper surface (not labeled), facing the fluorescent layer 26 of the first anode 20 and a bottom surface (not labeled), facing the fluorescent layer 36 of the second anode 30. The upper and bottom surfaces of the network 42 each have an electron emission layer 44, 46 formed thereon. The network 42 is advantageously made of at least one of a material selected from the group consisting of silver (Ag), copper (Cu), nickel (Ni), and gold (Au). The network 42 is preferably made from Ni.

Figure 5:
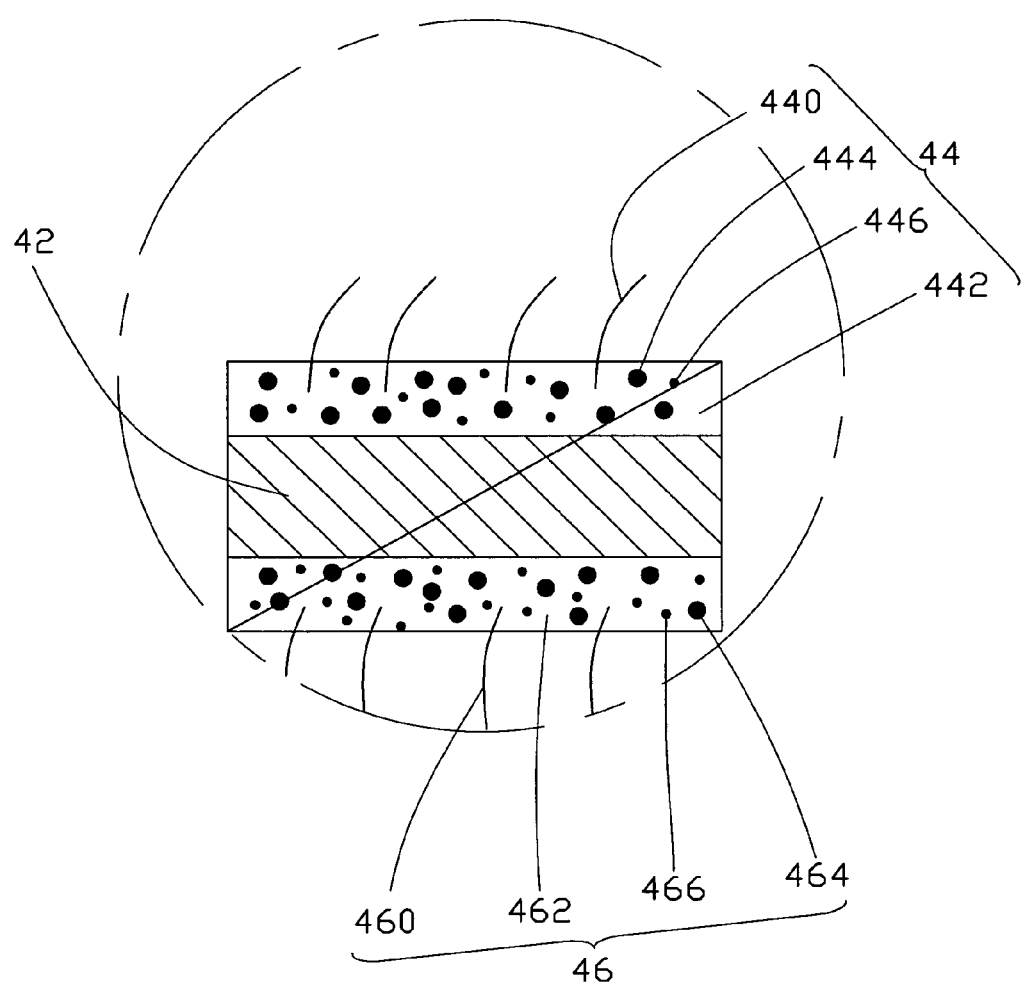
FIG. 5 is an enlarged view of a circled portion V of FIG. 4.

Referring to FIG. 5, each of the electron emission layers 44, 46 includes a plurality of carbon nanotubes 440, 460, metallic conductive particles 444, 464, and getter powders 446, 466; and a glass matrix 442, 462. The carbon nanotubes 440, 460, the metallic conductive particles 444, 464, and the getter powders 446, 466 are dispersed in the glass matrix 442, 462. A length of each of the nanotubes 440, 460 is advantageously in the range from about 5 micrometers to about 15 micrometers, a diameter thereof is usefully in the range from about 1 nanometer to about 100 nanometers, and one end thereof is exposed out of (i.e., anchored within and extending therefrom) a top surface of the electron emission layer 44, 46. The metallic conductive particles 444, 464 are beneficially made of silver (Ag) or indium tin oxide (ITO) and are used to electrically connect the network 42 with the nanotubes 440, 464. The getter powders 446, 466 are usefully made of a non-evaporating getter material (i.e., a material generally selected from the group consisting of titanium (Ti), zirconium (Zr), hafnium (Hf), thorium (Th), aluminum (Al), thulium (Tm), and alloys substantially composed of at least two such metals). The average diameter of the getter powders 446, 466 is advantageously in the range from about 1 micrometer to about 10 micrometers.

Each of the supporting members 50 is advantageously made of a transparent and hard material, in order to protect the field emission double-plane light source 10 from the atmospheric pressure thereon and from other exterior effects (e.g., potential environmental contamination or mechanical impact), thereby ensuring the safety thereof. Preferably, the field emission double-plane light source 10 has four supporting members 50: a first two respectively arranged between the first anode 20 and the cathode 40 on opposite sides of the cathode 40; and a second two respectively arranged between the cathode 40 and the second anode 30 and disposed on two opposite sides of the cathode 40.

The sealing body 60 is made from a sealing material (e.g., glass) to seal the edges of the field emission double-plane light source 10 to thereby form a sealed chamber in an inner portion thereof. Upon forming of such a sealed chamber, it is possible for the interior of the field emission double-plane light source 10 to be evacuated (so long as an evacuation/gas flow port remains that can be later sealed; otherwise, evacuation needs to occur prior to completion of sealing), achieving a vacuum therein.

In use, a strong electrical field is provided for the first and second anodes 20, 30 and the cathode 40. The strong field excites the carbon nanotubes 440, 460 of the electron emission layers 44, 46 to emit electrons. The electrons bombard the respective fluorescent layers 26, 36 of the anodes 20, 30, thereby producing visible light in two opposite directions. Furthermore, the getter powders 446, 466 exhaust the gas produced by the fluorescent layers 26, 36 and/or any potential residual gas in the field emission double-plane light source 10, thus ensuring that the field emission double-plane light source 10 is able to maintain a high degree of vacuum.

A method for making the above-mentioned field emission double-plane light source 10 generally includes:

(a) providing a certain number of carbon nanotubes 440, 460, metallic conductive particles 444, 464, glass particles (later melted to form glass matrixes 442, 462), and getter powders 446, 466; a conductive network 42; a pair of anodes 20, 30 (i.e., a first anode 20 and a second anode 30); and a number of supporting members 50, each of the anodes 20, 30 having an anode substrate 22, 32, an anode conductive layer 24, 34 formed on the anode substrate 22, 32, and a fluorescent layer 26, 36 formed on the anode conductive layer 24, 34;

(b) mixing the nanotubes 440, 460, the metallic conductive particles 444, 464, the glass particles and the getter powders 446, 466 in an organic medium to form an admixture;

(c) forming layers of the admixture on an upper surface and a bottom surface of the network 42;

(d) drying and then baking the admixture at a temperature of about 300° C. to about 600° C. to soften and/or melt the glass particles to result in the glass matrix 442, 462 with the nanotubes 440, 460, the metallic conductive particles 444, 464 and the getter powders 446, 466 dispersed therein, in order to yield electron emission layers 44, 46 on the network 42 to finally form a cathode 40; and (e) thereafter, assembling and sealing the anodes 20, 30, the cathode 40, and the supporting members 50 to define an enclosed interior, and evacuating the enclosed interior to yield the field emission double-plane light source 10.

In step (a), the carbon nanotubes 440, 460 are formed by an appropriate technology (e.g., a chemical vapor deposition (CVD) method, an arc-discharge method, a laser ablation method, a gas phase combustion synthesis method, etc.). Preferably, the average length of the nanotubes 440, 460 is in the range from about 5 micrometers to about 15 micrometers. The glass particles are selected from glass powders with a low melting temperature (e.g., glass powders with a low melting temperature in the range of about 350° C. to about 600° C., and preferably composed, in part, of silicon oxide ($SiO_2$), boric trioxide ($B_2O_3$), zinc oxide (ZnO), and vanadium pentoxide ($V_2O_5$)). The average diameter of the glass particles is preferably in the range of about 10 nanometers to about 100 nanometers. The metallic conductive particles 444, 464 are ball-milled, yielding particle diameters in the range from about 0.1 micrometer to about 10 micrometers. The getter powders 446, 466 are also ball-milled, producing powder diameters in the range from about 1 micrometer to about 10 micrometers. Preferably, the getter powders 446, 466 are made of a getter material with an activity temperature of about 300° C. to about 500° C. (e.g., an alloy containing Zr and Al). Each of the anode conductive layer 24, 34 is formed on the substrate 22, 32 by, e.g., a sputtering method or a thermal evaporating method, and the fluorescent layer 26, 36 is created on the anode conductive layer 24, 34 by, for example, a depositing method.

In step (b), the organic medium is composed of a certain amount of solvent (e.g., terpineol, etc.), and a smaller amount of a plasticizer (e.g., dimethyl phthalate, etc.) and a stabilizer (e.g., ethyl cellulose, etc.). The percent by mass of the getter powders 316 is in the range of about 40% to about 80% of the admixture. The process of the mixing is preferably performed at a temperature of about 60° C. to about 80° C. for a sufficient period of time (e.g., about 3 hours to about 5 hours). Furthermore, low-power ultrasound is preferably applied in step (b), to improve the dispersion of the carbon nanotubes 440, 460, the metallic conductive particles 444, 464 and the getter powders 446, 466.

Step (c) is performed in a condition of a low dust content (e.g., being preferably lower than 1000 mg/m$^3$).

In step (d), the process of drying volatilizes the organic medium from the network 42, and the process of baking melts or at least softens the glass particles to permit flow thereof in order to form the glass matrixes 442, 462 of the electron emission layers 44, 46. The processes of drying and baking are performed in a vacuum condition and/or in a flow of a protective/inert gas (e.g., noble gas, nitrogen). An outer surface of each of the electron emission layers 44, 46 is advantageously abraded and/or selectively etched, in order to expose ends of at least a portion of the nanotubes 440, 460. The exposure of such ends increases the field emission performance of the electron emission layers 44, 46.

In step (e), a sealing material (e.g., a glass with a melting temperature of about 350° C. to about 600° C.) is applied so as to extend between and contact edges of both the first and second anodes 20, 30 and the cathode 40 of the field emission double-plane light source 10 and is softened/formed at a temperature of about 400° C. to about 500° C. The sealing material forms the sealing body 60 after cooling, to establish a chamber within the field emission double-plane light source 10 that can be evacuated. The sealing body 60, additionally, promotes the mechanical integrity of the field emission double-plane light source 10, helping to space the first anode 20 from the cathode 40 and space the second anode 30 from the cathode 40.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A field emission double-plane light source comprising:
a first anode;
a second anode, each of the first and second anodes comprising an anode substrate, an anode conductive layer, and a fluorescent layer, the anode conductive layer being formed on a surface of the anode substrate, the fluorescent layer being created on the anode conductive layer; and
a cathode arranged between the first and second anodes and separated therebetween, the cathode comprising a conductive network, the network having two opposite surfaces each facing a respective one of the first and second anodes, each of the surfaces of the network having an electron emission layer thereon, each electron emission layer respectively facing a corresponding fluorescent layer of one of the first and second anodes, each of the electron emission layers comprising a glass matrix, and a plurality of carbon nanotubes, metallic conductive particles, and getter powders dispersed in the glass matrix.

2. The field emission double-plane light source as described in claim 1, wherein the getter powders are composed of a non-evaporating getter material.

3. The field emission double-plane light source as described in claim 1, wherein an average diameter of the getter powders is in the range from about 1 micrometer to about 10 micrometers.

4. The field emission double-plane light source as described in claim 1, wherein the getter powders are comprised of at least one a material selected from the group consisting of titanium, zirconium, hafnium, thorium, aluminum, and thulium.

5. The field emission double-plane light source as described in claim 1, wherein an average diameter of the nanotubes is in the range from about 1 nanometer to about 100 nanometers, and an average length thereof is in the range from about 5 micrometers to about 15 micrometers.

6. The field emission double-plane light source as described in claim 1, wherein the anode conductive layers of the first and second anodes are each an indium tin oxide film.

7. The field emission double-plane light source as described in claim 1, wherein the metallic conductive particles are comprised of a material selected from indium tin oxide and silver, and an average diameter thereof is in the range of about 0.1 micrometer to about 10 micrometers.

8. The field emission double-plane light source as described in claim 1, wherein the anode substrates of the first and second anodes are each a transparent glass plate.

9. The field emission double-plane light source as described in claim 1, wherein the network is comprised of a material selected from the group consisting of silver, copper, nickel, gold and an alloy composed of at least two such metals.

10. The field emission double-plane light source as described in claim 1, further comprising a sealing body located around edges of the field emission double-plane light source.

11. The field emission double-plane light source as described in claim 1, further comprising a supporting member located between the first anode, the cathode, and the second anode.

12. The field emission double-plane light source as described in claim 1, further comprising an aluminum film located on a surface of the fluorescent layer.

13. The field emission double-plane light source as described in claim 1, wherein the fluorescent layer is made of at least one of white and colored fluorescent materials.

14. A field emission double-plane light source comprising:
a first anode;
a second anode, each of the first and second anodes comprises an anode substrate, an anode conductive layer, and a fluorescent layer, the anode conductive layer located on a surface of the anode substrate, the fluorescent layer located on the anode conductive layer; and
a cathode arranged between the first and second anodes, the cathode comprising a metallic based network, the metallic based network comprising a plurality of metal wires crossed with each other defining a plurality of thorough openings and having two opposite surfaces, each opposite surface of metallic based network having one electron emission layer thereon, each electron emission layer is opposite to a corresponding fluorescent layer of one of the first and second anodes, wherein each of the electron emission layers comprises a glass matrix, and a plurality of carbon nanotubes, metallic conductive particles, and getter powders dispersed in the glass matrix.

15. The field emission double-plane light source as described in claim 14, wherein the plurality of carbon nanotubes, metallic conductive particles, and getter powders are dispersed in the glass matrix.

* * * * *